(12) United States Patent
Jin et al.

(10) Patent No.: US 12,468,711 B2
(45) Date of Patent: Nov. 11, 2025

(54) PATTERN IDENTIFICATION IN STRUCTURED EVENT DATA

(71) Applicant: Plaid Inc., San Francisco, CA (US)

(72) Inventors: Chris Jin, Atlanta, GA (US); Royce Kok, New York, NY (US); Adam Boritz, New York, NY (US); Zak Bennett, New York, NY (US); Alex Kang, New York, NY (US); Raymond Cano, New York, NY (US)

(73) Assignee: Plaid Inc., San Francisco, CA (US)

( * ) Notice: Subject to any disclaimer, the term of this patent is extended or adjusted under 35 U.S.C. 154(b) by 152 days.

(21) Appl. No.: 18/318,367

(22) Filed: May 16, 2023

(65) Prior Publication Data

US 2023/0367774 A1   Nov. 16, 2023

Related U.S. Application Data

(60) Provisional application No. 63/364,789, filed on May 16, 2022.

(51) Int. Cl.
*G06F 16/00* (2019.01)
*G06F 16/2455* (2019.01)

(52) U.S. Cl.
CPC .. *G06F 16/24568* (2019.01); *G06F 16/24564* (2019.01)

(58) Field of Classification Search
CPC .............. G06F 16/24568; G06F 16/24564

USPC ........................................................ 707/769
See application file for complete search history.

(56) References Cited

U.S. PATENT DOCUMENTS

| | | | |
|---|---|---|---|
| 10,726,491 B1* | 7/2020 | Hockey | H04L 63/1433 |
| 2013/0325548 A1* | 12/2013 | Kulkarni | H04M 15/8011 |
| | | | 705/7.29 |
| 2014/0173695 A1* | 6/2014 | Valdivia | G06F 21/33 |
| | | | 726/4 |
| 2016/0117650 A1* | 4/2016 | Weidenmiller | G06Q 20/405 |
| | | | 705/44 |
| 2018/0246943 A1* | 8/2018 | Avagyan | G06F 16/29 |
| 2019/0035032 A1* | 1/2019 | Soufiani | G06Q 40/12 |
| 2021/0406896 A1* | 12/2021 | Chaturvedi | G06Q 20/405 |

FOREIGN PATENT DOCUMENTS

WO        2017210041 A1    12/2017

* cited by examiner

*Primary Examiner* — Monica M Pyo
(74) *Attorney, Agent, or Firm* — Harrity & Harrity, LLP

(57) ABSTRACT

In some implementations, a server may receive, from a user device, one or more credentials associated with a data source. Accordingly, the server may receive, from the data source and using the one or more credentials, a set of structured data including a plurality of entries. The server may identify at least one recurring event based on one or more entries in the plurality of entries, and may determine, for the at least one recurring event, one or more derived properties. The server may generate a data structure indicating the at least one recurring event and the one or more derived properties, and may transmit, to the user device, the generated data structure.

20 Claims, 7 Drawing Sheets

PATTERN IDENTIFICATION IN STRUCTURED EVENT DATA

RELATED APPLICATION

This application claim priority to U.S. Provisional Patent Application No. 63/364,789, filed May 16, 2022, which is incorporated herein by reference in its entirety.

BACKGROUND

Structured data, such as event data and/or transactional data, may include dates (and/or times) for each event or each transaction. Some of the entries may be recurring (e.g., repeating approximately periodically).

SUMMARY

Some implementations described herein relate to a system for pattern identification. The system may include one or more memories and one or more processors communicatively coupled to the one or more memories. The one or more processors may be configured to receive, from a data source, a set of structured data including a plurality of entries. The one or more processors may be configured to identify at least one first recurring event based on three or more entries in the plurality of entries. The one or more processors may be configured to identify at least one second recurring event based on one or more entries in the plurality of entries. The one or more processors may be configured to determine, for the at least one first recurring event, one or more first derived properties, and for the at least one second recurring event, one or more second derived properties. The one or more processors may be configured to generate a data structure indicating the at least one first recurring event, the one or more first derived properties, the at least one second recurring event, and the one or more second derived properties. The one or more processors may be configured to transmit, to a user device, the generated data structure.

Some implementations described herein relate to a method of data enrichment. The method may include receiving, from a user device, one or more credentials associated with a data source. The method may include receiving, from the data source and using the one or more credentials, a set of structured data including a plurality of entries. The method may include identifying at least one recurring event based on one or more entries in the plurality of entries. The method may include determining, for the at least one recurring event, one or more derived properties. The method may include generating a data structure indicating the at least one recurring event and the one or more derived properties. The method may include transmitting, to the user device, the generated data structure.

Some implementations described herein relate to a non-transitory computer-readable medium that stores a set of instructions for data enrichment for a device. The set of instructions, when executed by one or more processors of the device, may cause the device to receive, from a data source, a set of structured data including a plurality of entries. The set of instructions, when executed by one or more processors of the device, may cause the device to identify at least one first recurring event based on three or more entries in the plurality of entries. The set of instructions, when executed by one or more processors of the device, may cause the device to receive, from a user device, an indication to perform early detection. The set of instructions, when executed by one or more processors of the device, may cause the device to identify, based on the indication, at least one second recurring event based on one or more entries in the plurality of entries. The set of instructions, when executed by one or more processors of the device, may cause the device to generate a data structure indicating the at least one first recurring event and the at least one second recurring event. The set of instructions, when executed by one or more processors of the device, may cause the device to transmit, to the user device, the generated data structure.

DETAILED DESCRIPTION

The following detailed description of example implementations refers to the accompanying drawings. The same reference numbers in different drawings may identify the same or similar elements.

Structured data, such as event data and/or transactional data, may include dates (and/or times) for each event or each transaction. Within a set of structured data, some entries may be recurring (e.g., repeating approximately periodically). Identifying recurring entries consumes power and processing resources at a user device and is time-consuming. Moreover, the user device often lacks access to additional sets of structured data (e.g., for training a machine learning model and/or for determining recurrence rules) and thus detects recurring entries with a high error rate (e.g., a high false positive rate and optionally a high false negative rate as well).

Some implementations described herein provide for remote pattern identification on a set of structured data, such as event data and/or transactional data. For example, a remote server may leverage more accurate rules and/or machine learning models to improve accuracy as compared with pattern identification performed at a user device. Additionally, the remote server helps the user device conserve power and processing resources and also reduces latency because the remote server can perform pattern identification faster and more efficiently than the user device (which typically has a lower processing rate and greater memory constraints).

Figure 1A:
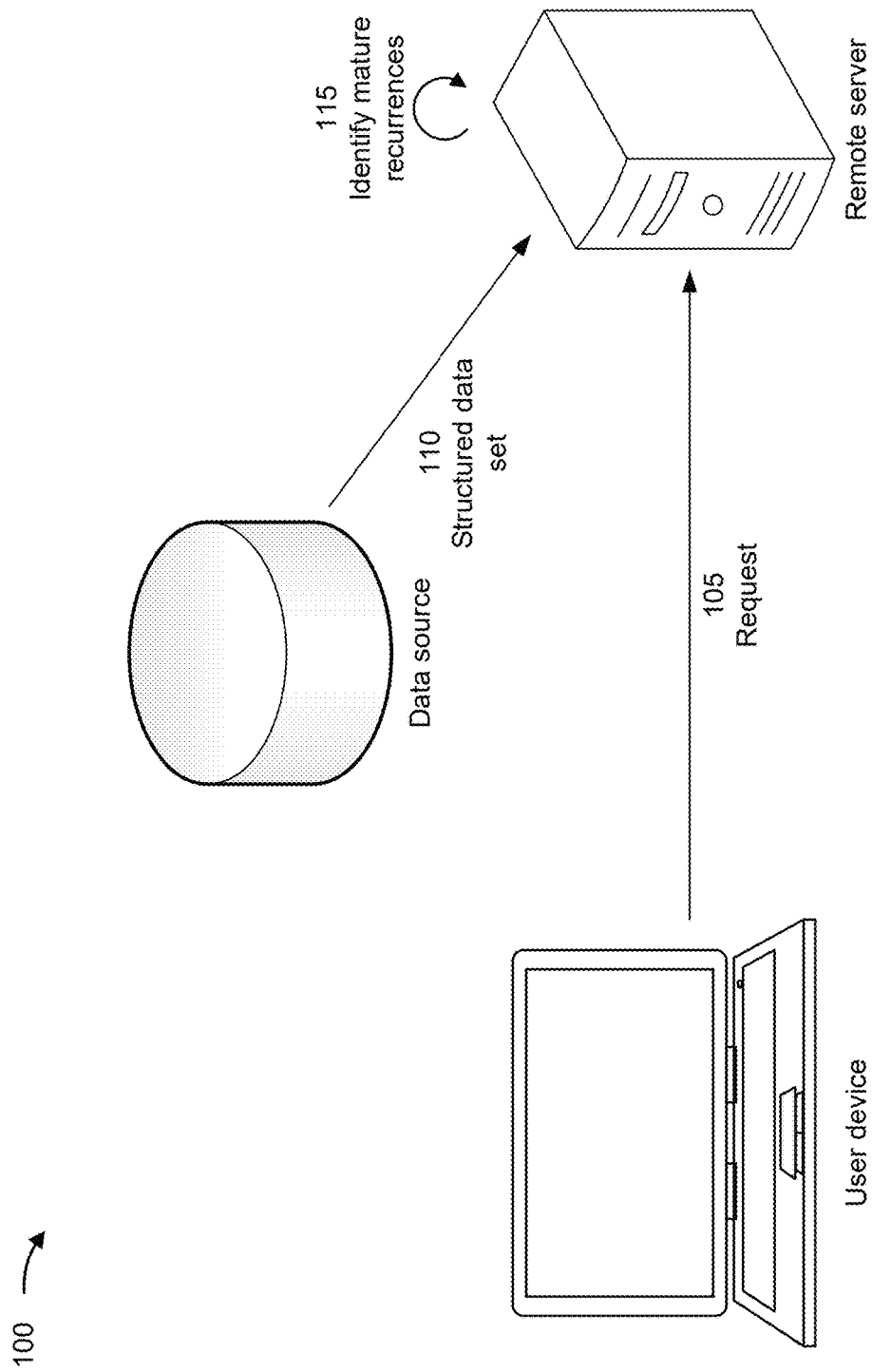
FIGS. 1A-1C are diagrams of an example implementation relating to pattern identification.
Figure 1B:
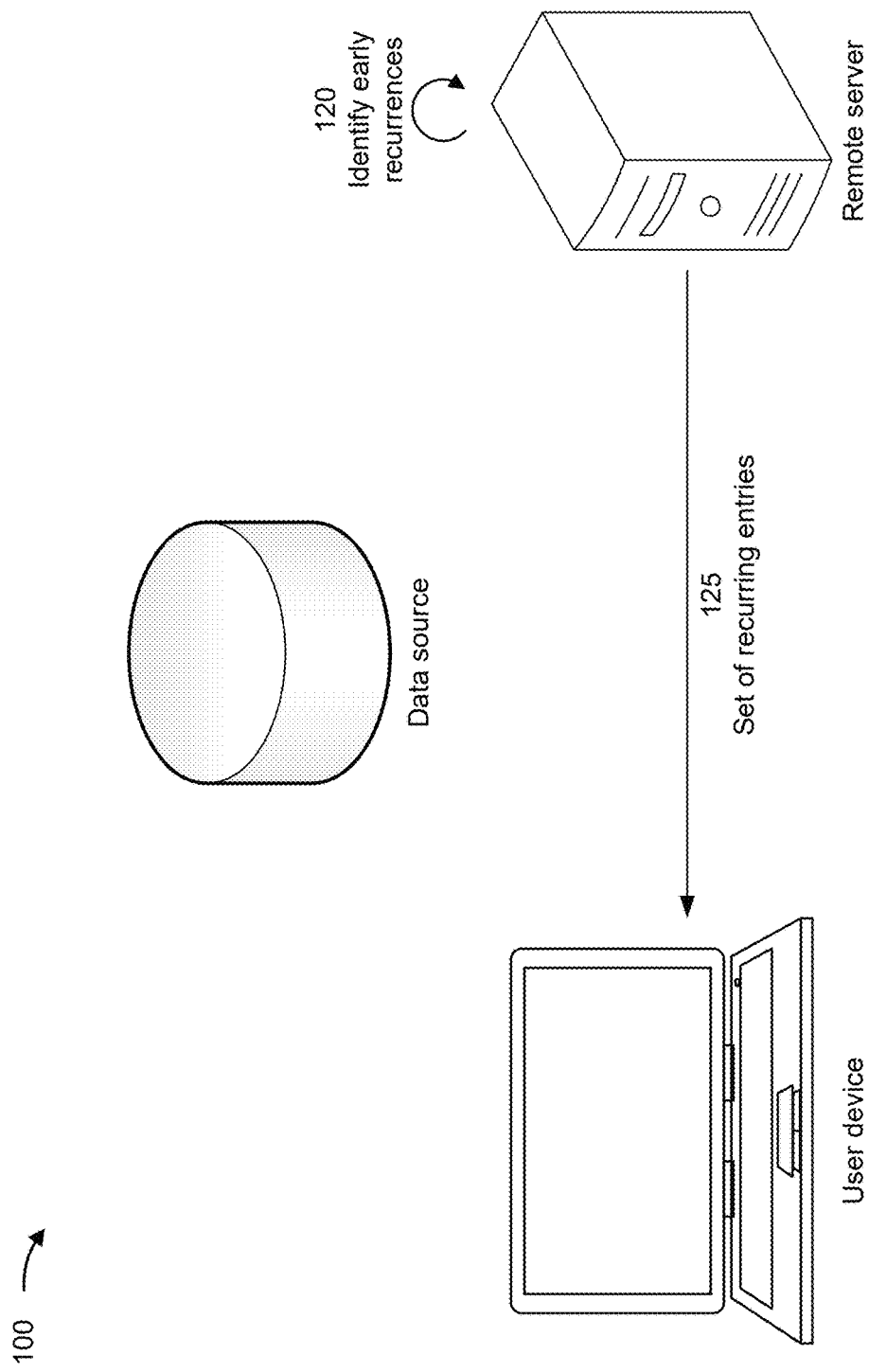
Figure 1C:
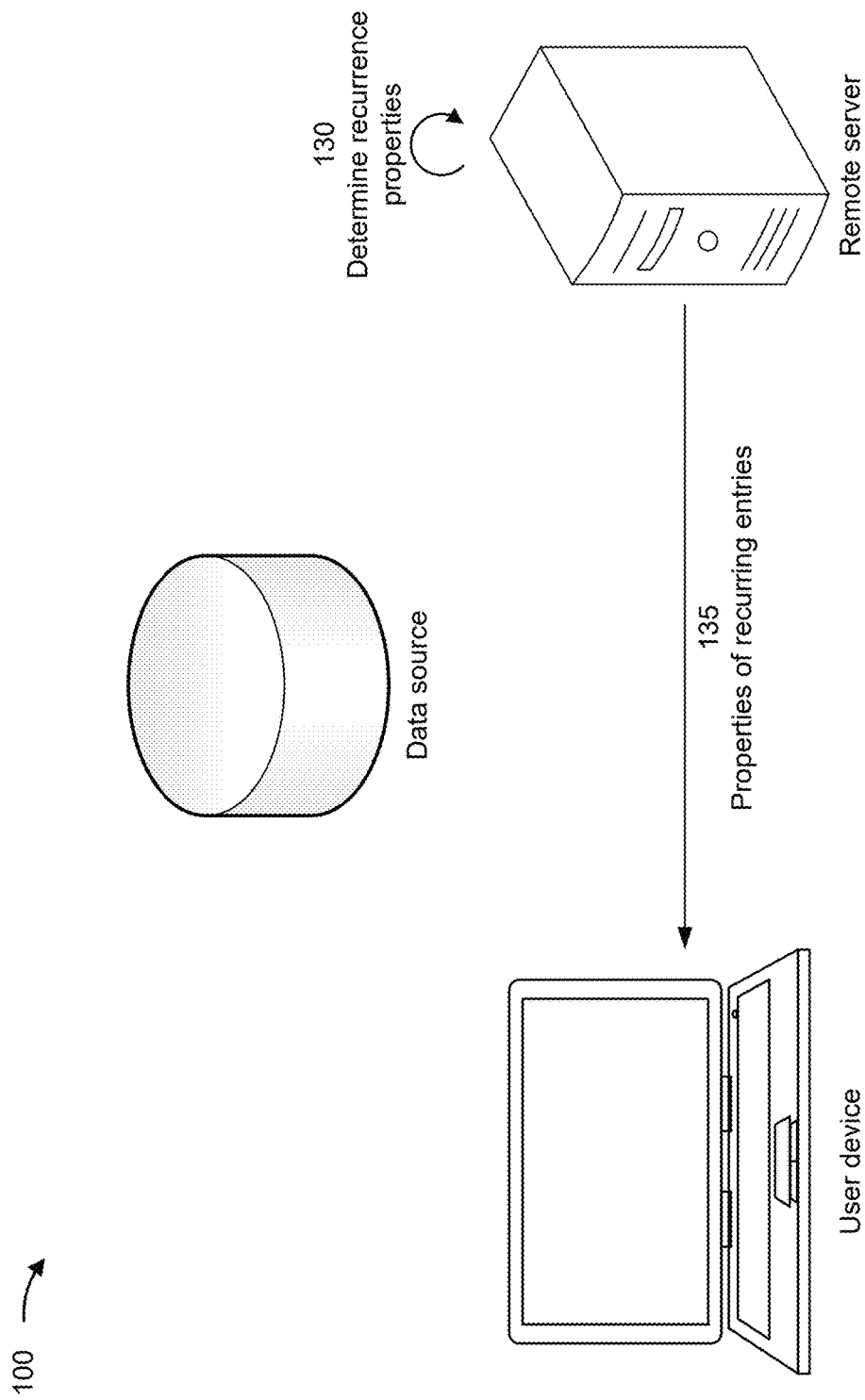

FIGS. 1A-1C are diagrams of an example 100 associated with pattern identification for structured event data. As shown in FIGS. 1A-1C, example 100 includes a remote server, a user device, and a data source. These devices are described in more detail in connection with FIGS. 3 and 4.

As shown by reference number 105, the user device may transmit, and the remote server may receive, a request for pattern identification. For example, the user device may perform a call to an application programming interface (API) provided by the remote server. In some implementations, the user device may perform a call to an API associated with a/transactions/recurring/get endpoint.

In some implementations, the request may include one or more credentials associated with the data source, such as an access token, a username and password, and/or another type of access credential. For example, the user device may include an access_token parameter that encapsulates a token associated with the user device and that authorizes the user device to receive structured data (e.g., linked to one or more accounts associated with the data source). The token may have been generated (e.g., by the remote server and/or the data source) and provided to the user device to use in API calls. The token may be based on a secret (e.g., a private key) generated by, or at least associated with (e.g., via a key distribution center (KDC)), the user device.

Additionally, the request may include an identifier associated with the user device (e.g., a client id parameter), a secret associated with the user device (e.g., a secret parameter), and/or one or more identifiers associated with the one or more accounts (e.g., a account_ids parameter). The secret may be a certificate or another type of data structure that is uniquely (relative to the remote server) associated with the user device. The identifier(s) of the account(s) may be identifier(s) used by the data source (e.g., a username, an email address, or an account number, rather than a session name or an Internet protocol (IP) address) and/or may be identifier(s) used by the remote server (e.g., no other accounts accessed by the remote server are associated with the same identifier).

Using the credentials, the remote server may receive a set of structured data from the data source, as shown by reference number 110. For example, the remote server may transmit a request to the data source (e.g., including the one or more credentials) and receive the initial set of structured data in response (e.g., using an API call and response and/or a hypertext transfer protocol (HTTP) request and response). Alternatively, the data source may be configured to periodically update the remote server including a first transmission of the initial set of structured data. The remote server may store the initial set of structured data. In some implementations, the remote server may use an encrypted storage and/or another type of secure storage for the initial set of structured data. The remote server may use a local storage (e.g., a memory controlled by the remote server) and/or a storage that is at least partially external (e.g., logically, physically, and/or virtually) to the remote server.

Although the example 100 is described in connection with the remote server receiving the initial set of structured data from the data source, other examples may include the user device providing the initial set of structured data. For example, the user device may include the initial set of structured data in the request, as described above in connection with reference number 105.

As shown by reference number 115, the remote server may identify mature recurrences in the set of structured data from the data source. For example, a mature recurrence may comprise an event that is associated with at least three entries in the set of structured data. To determine that at least three entries are associated with a same event (and thus a mature recurrence), the remote server may apply one or more rules. For example, the remote server may verify that a description string associated with each entry includes a same name and/or that a standard deviation associated with the amounts of the entries satisfies a threshold, among other examples. Additionally, or alternatively, the remote server may apply a machine learning model, as described in connection with FIG. 2.

As shown by reference number 120, the remote server may identify early recurrences in the set of structured data from the data source. For example, an early recurrence may comprise an event that is associated with at least one entry in the set of structured data. To detect the early recurrence, the remote server may apply one or more rules. For example, the remote server may verify that a description string associated with the entry includes a name that matches a list of early recurrence names and/or that an amount associated with the entry matches a list of early recurrency amounts, among other examples. Additionally, or alternatively, the remote server may apply a machine learning model, as described in connection with FIG. 2.

In some implementations, a recurrence in the set of structured data may be annual. Because annual recurrences are associated with fewer entries (e.g., only a single entry or perhaps two or three entries, depending on a time scale associated with the set of structured data), the remote server may apply a first rule to match a name included in an entry in the set of structured data with a list of names associated with annual recurrences. The matching may be a fuzzy matching, where fuzzy matching includes a quantity of matching characters satisfying a threshold, a proportion of matching characters satisfying a threshold, and/or an application of known aliases (e.g., matching "name.com" with "name" or matching "nameN68th" with "nameNorth68th," among other examples). Additionally, the remote server may apply a second rule to match an amount included in an entry in the set of structured data with a list of amounts associated with annual recurrences (and/or associated with the matched name). The matching may be within a margin of error on account of sales tax, discounts, and/or another type of modification to an amount. For example, an amount of 69.99 associated with an annual recurrence may vary up to 10% larger on account of sales tax and/or up to 10% smaller based on extant discounts.

In order to identify the list of names associated with annual recurrences, the remote server may perform clustering, on a plurality of test transactions, by name (e.g., using techniques described in connection with FIG. 2). The plurality of test transactions may comprise entries stored at the remote server and associated with a plurality of accounts (and a plurality of user devices). The remote server may therefore cluster the plurality of test transactions into a plurality of groups, where each group includes one or more test transactions that have similar names. To validate the names, the remote server may apply foundational large language models (LLMs) to standardize the names and identify whether each name is associated with annual recurrences. Therefore, the remote server may conserve power and processing resources by eliminating groups that are associated with names that are not associated with annual recurrences. Furthermore, the remote server may perform clustering, on each group, by amount (e.g., using techniques described in connection with FIG. 2). The remote server may therefore identify one or more target amounts, associated with annual recurrences, for each group. Accordingly, the remote server may generate the first and second rules using the target amount(s) and the name associated with each group.

Additionally, or alternatively, the remote server may filter results from the rule(s) and/or the machine learning model. For example, the remote server may remove recurrences associated with names that are on a list of non-recurring merchants (e.g., names associated with grocery stores, restaurants, or gas stations, among other examples). Similarly as described above, the list of non-recurring merchants may be determined, at least in part, using foundational LLMs. Additionally, or alternatively, the remote server may remove recurrences associated with categories that are on a list of non-recurring categories (e.g., recurrences categorized as food or general goods, among other examples). Similarly as described above, the list of non-recurring categories may be determined, at least in part, using foundational LLMs.

Accordingly, as shown by reference number 125, the remote server may transmit, and the user device may receive, a data structure indicating the set of recurring entries. For example, the data structure may comprise a list indicating the mature recurrences and the early recurrences in the set of structured data. In some implementations, the data structure may include a list of incoming transactions (e.g., an inflow_streams array) and a list of outgoing transactions (e.g., an outflow_streams array). The data structure may additionally include an updated_datetime parameter indicating a datetime when the remote server most recently updated the set of structured data with the data source. For example, the remote server may update the set of structured data periodically in addition to, or in lieu of, updating the set of structured data in response to a request from the user device. The remote server may identify the recurring entries and may transmit the data structure in response to the request from the user device. Alternatively, the remote server may identify the recurring entries in response to receiving the initial set of structured data (or an update to the set of structured data, as described below) from the data source but may transmit the data structure in response to the request from the user device.

In some implementations, the data structure may include, for each recurring entry, an identifier of the account associated with the recurring entry (e.g., the same account_id included in the request from the user device), an identifier of the recurring entry (e.g., a stream_id generated and assigned by the remote server), and/or a set of identifiers (e.g., in a transaction_ids parameter) associated with entries in the set of structured data that are classified as included in the recurring entry (e.g., each recurring entry may be associated with more than one entry in the set of structured data).

Additionally, in some implementations, the remote server may determine properties associated with the identified recurrences, as shown by reference number 130. For example, the remote server may identify a category (e.g., using a machine learning model, as described in connection with FIG. 2), a name (e.g., filtered and standardized, as described above), a description (e.g., similarly filtered and standardized), an average amount, a most recent amount, an initial or first date, a most recent or last date, and/or a frequency (e.g., estimated using a machine learning model, as described in connection with FIG. 2), for each recurrence. Additionally, or alternatively, the remote server may estimate whether each recurrence is active (e.g., based on whether an expected entry, based on the frequency, is missing). In some implementations, the user device may indicate a property in the request for the remote server to determine. For example, the request may include a Boolean or another binary data type (e.g., an include personal_finance_category parameter) such that the remote server determines the category for each recurrence based on the Boolean.

Accordingly, as shown by reference number 135, the remote server may transmit, and the user device may receive, an indication of the determined properties. The determined properties may be referred to as "derived properties" because the remote server may derive the properties based on information included in, and metadata associated with, the set of structured data. In some implementations, the remote server may indicate the determined properties in the data structure described above. For example, the data structure may include a category_id parameter, a description parameter, a merchant_name parameter, a first_date parameter, a last_date parameter, a frequency parameter, an average_amount parameter, a last_amount parameter, and/or an is_active parameter, among other examples. Additionally, or alternatively, the remote server may indicate whether the recurrence is a mature recurrence or an early detection recurrence using a status parameter. In some implementations, recurrences that are estimated to be inactive may include a tombstoned value in the status parameter.

The operations described in connection with FIGS. 1A-1C may be iterative. For example, the user device may send additional requests in the future, the remote server may update the set of structured data from the data source, and the remote server may transmit an additional data structure indicating an updated set of recurring entries. Additionally, in some implementations, the additional data structure may indicate updated properties associated with the updated set of recurring entries. Additionally, or alternatively, the remote server may be integrated (at least in part) with an aggregation system such that the remote server identifies recurring entries from multiple sets of structured data received from multiple data sources.

By using techniques as described in connection with FIGS. 1A-1C, the remote server conserves power and processing resources at the user device by identifying the recurrences. Additionally, the remote server leverages greater processing resources and memory (as well as access to test transactions, as described above) in order to increased accuracy and reduce latency in identifying the recurrences.

As indicated above, FIGS. 1A-1C are provided as an example. Other examples may differ from what is described with regard to FIGS. 1A-1C.

Figure 2:
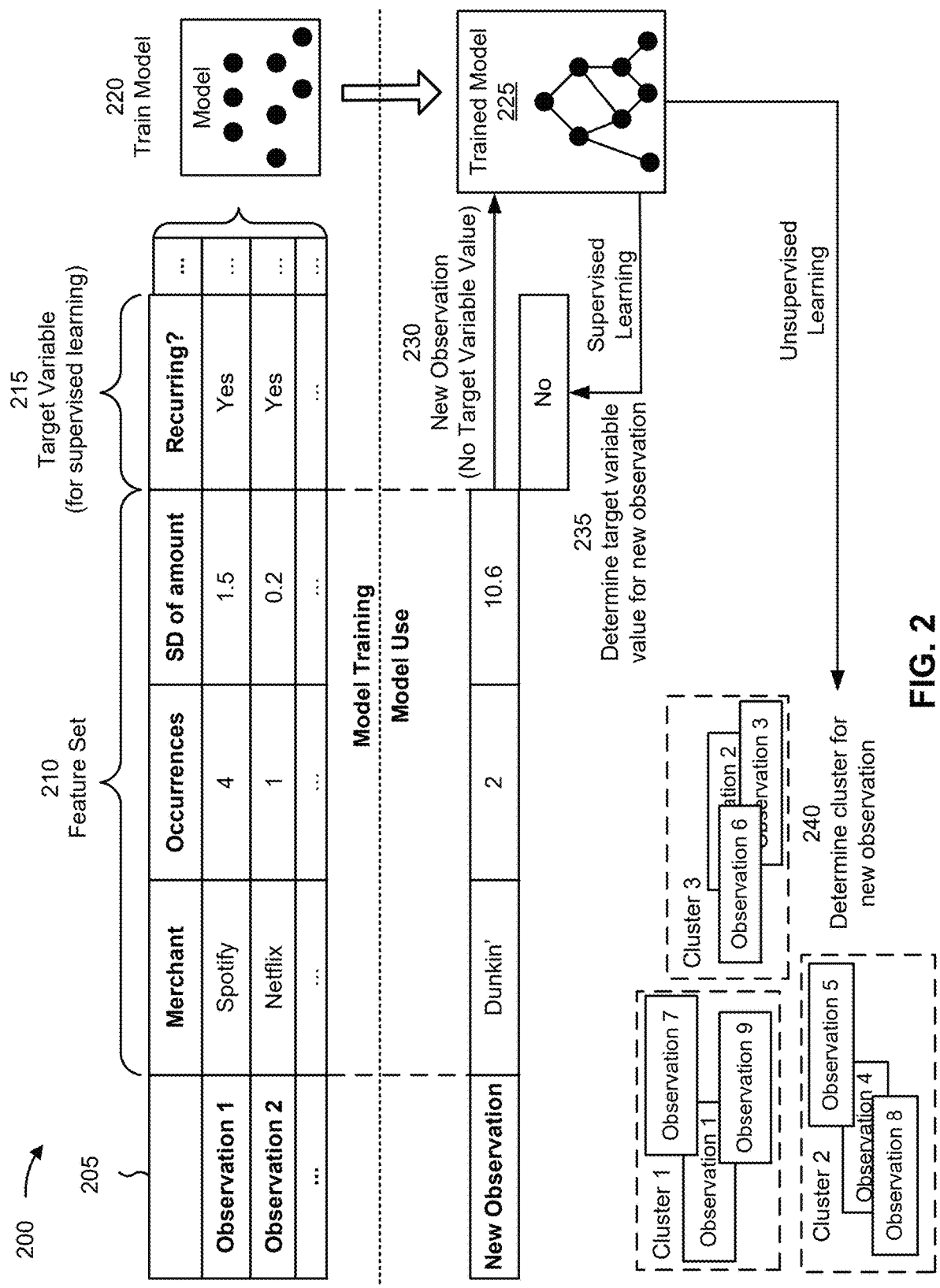
FIG. 2 is a diagram of an example implementation relating to training and using a machine learning model for implementations described herein.

FIG. 2 is a diagram illustrating an example 200 of training and using a machine learning model in connection with pattern identification. The machine learning model training and usage described herein may be performed using a machine learning system. The machine learning system may include or may be included in a computing device, a server, a cloud computing environment, or the like, such as the user device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from a user device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a merchant, a second feature of a quantity of occurrences, a third feature of a standard deviation associated with amounts, and so on. As shown, for a first observation, the first feature may have a value of "Spotify", the second feature may have a value of 4, the third feature may have a value of 1.5, and so on. These features and feature values are provided as examples, and may differ in other examples. For example, the feature set may include one or more of the following features: a mean associated with amounts, a median associated with amounts, a mode associated with amounts, an estimated periodicity, or a category of inflow or outflow, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is whether the events are recurring, which has a value of Yes for the first observation.

The feature set and target variable described above are provided as examples, and other examples may differ from what is described above. For example, for a target variable of whether the events are mature or early, the feature set may include a quantity of occurrences or an estimated periodicity, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of Dunkin', a second feature of 2, a third feature of 10.6, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of No for the target variable of whether the entries are recurring for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, categorizing the events as not recurring. The first automated action may include, for example, refraining from transmitting an indication that the events are recurring to the user device.

As another example, if the machine learning system were to predict a value of Yes for the target variable of whether the entries are recurring, then the machine learning system may provide a second (e.g., different) recommendation (e.g., categorizing the events as recurring) and/or may perform or cause performance of a second (e.g., different) automated action (e.g., transmitting an indication that the events are recurring to the user device).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., non-recurring events), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., recurring events), then the machine learning system may provide a second (e.g., different) recommendation (e.g., the second recommendation described above) and/or may perform or cause performance of a second (e.g., different) automated action, such as the second automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include an indication (e.g., a Boolean) of whether the events are indeed recurring, among other examples.

In this way, the machine learning system may apply a rigorous and automated process to identifying patterns in structured data sets. The machine learning system enables recognition and/or identification of tens, hundreds, thousands, or millions of features and/or feature values for tens, hundreds, thousands, or millions of observations, thereby increasing accuracy and consistency and reducing delay associated with pattern identification relative to requiring computing resources to be allocated for tens, hundreds, or thousands of operators to manually identify patterns in structured data sets using the features or feature values.

As indicated above, FIG. 2 is provided as an example. Other examples may differ from what is described in connection with FIG. 2.

Figure 3:
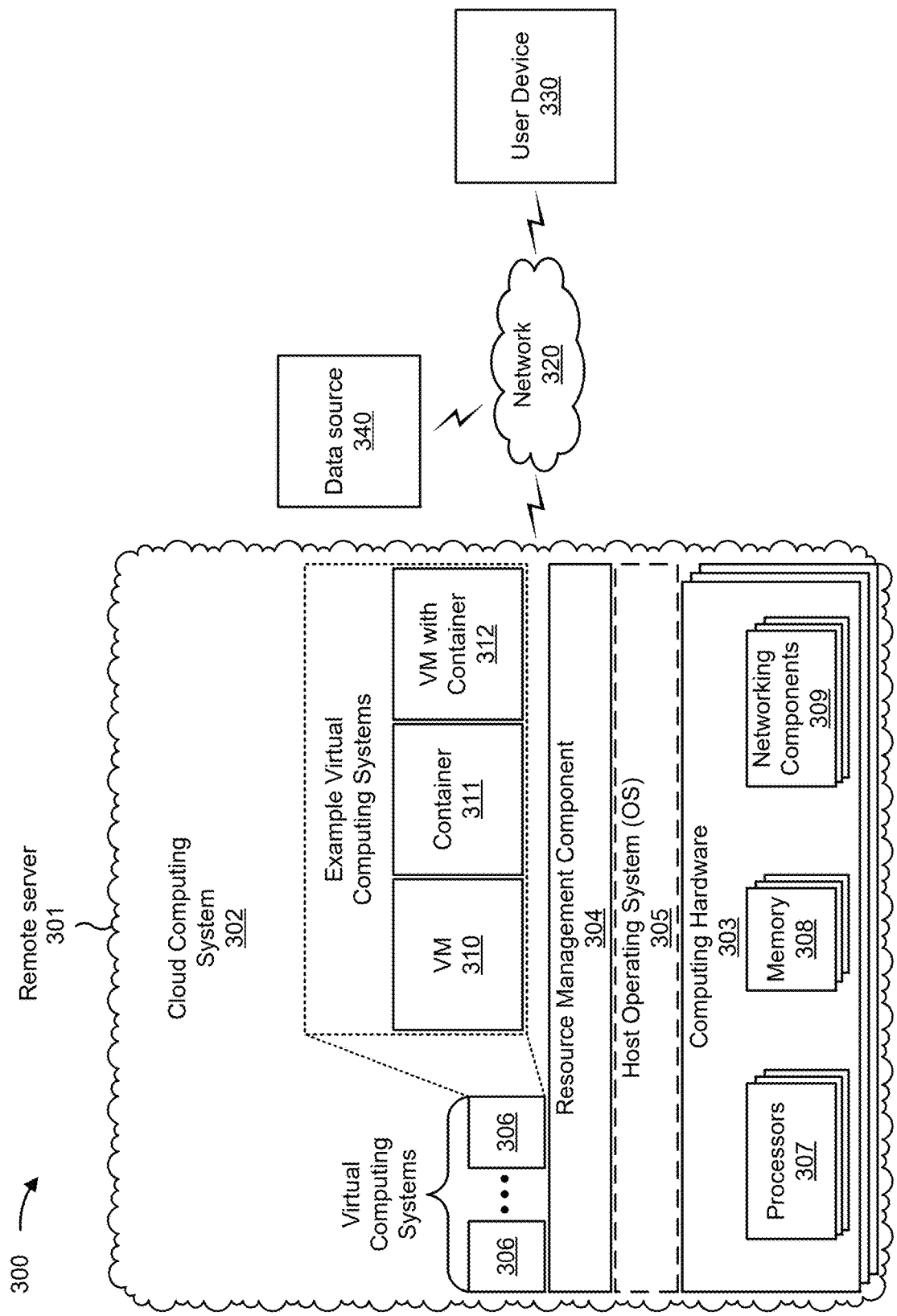
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a remote server 301, which may include one or more elements of and/or may execute within a cloud computing system 302. The cloud computing system 302 may include one or more elements 303-312, as described in more detail below. As further shown in FIG. 3, environment 300 may include a network 320, a user device 330, and/or a data source 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the remote server 301 may include one or more elements 303-312 of the cloud computing system 302, may execute within the cloud computing system 302, and/or may be hosted within the cloud computing system 302, in some implementations, the remote server 301 may not be cloud-based (e.g., may be implemented outside of a cloud computing system) or may be partially cloud-based. For example, the remote server 301 may include one or more devices that are not part of the cloud computing system 302, such as device 400 of FIG. 4, which may include a stand-alone server or another type of computing device. The remote server 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The user device 330 includes one or more devices capable of receiving, generating, storing, processing, and/or providing information associated with pattern identification, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The data source 340 one or more devices capable of receiving, generating, storing, processing, and/or providing information associated with pattern identification, as described elsewhere herein. The data source 340 may include a communication device and/or a computing device. For example, the data source 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
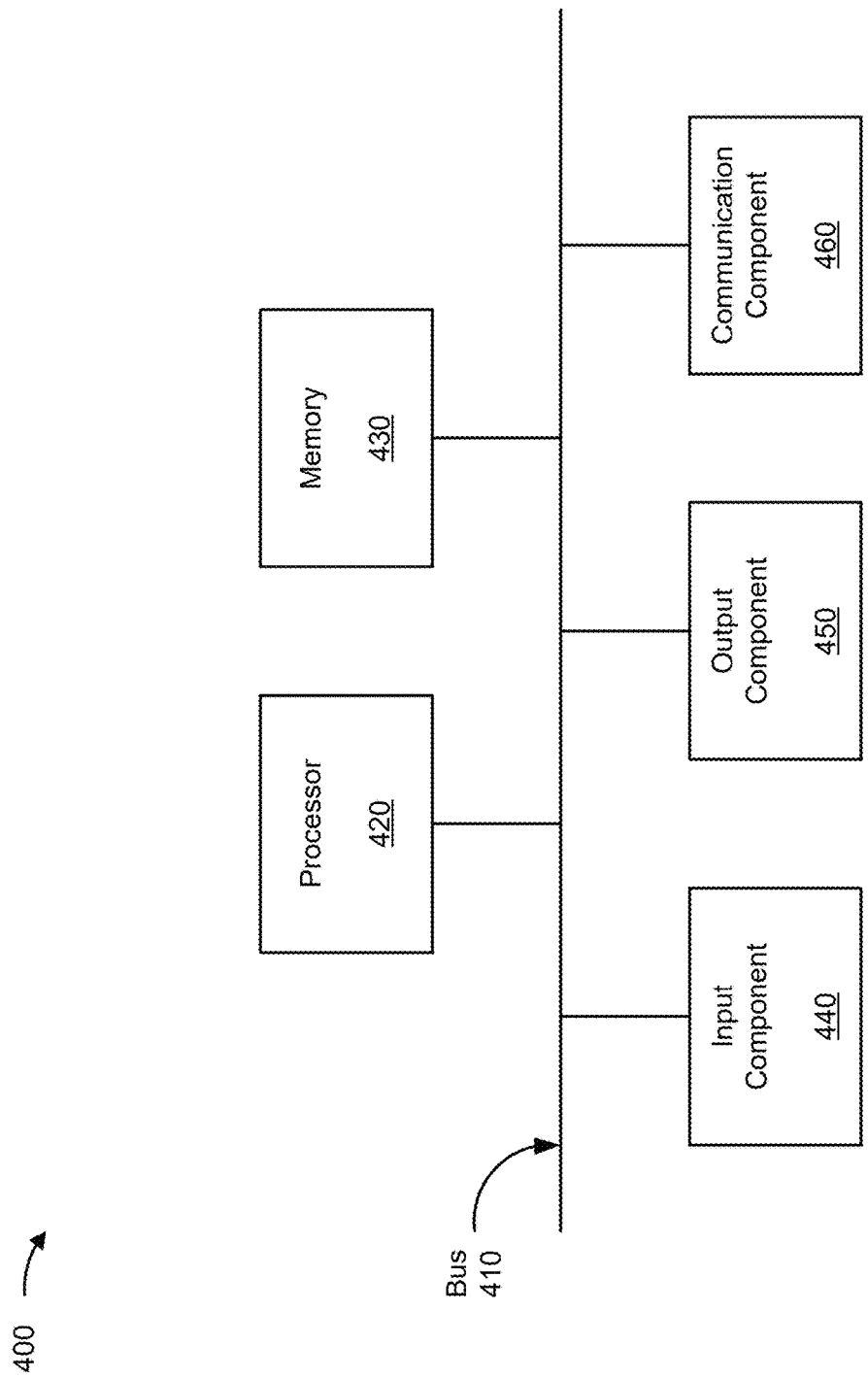
FIG. 4 is a diagram of example components of one or more devices of FIG. 3.

FIG. 4 is a diagram of example components of a device 400, which may correspond to a user device, a remote server, and/or a data source. In some implementations, the user device, the remote server, and/or the data source may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
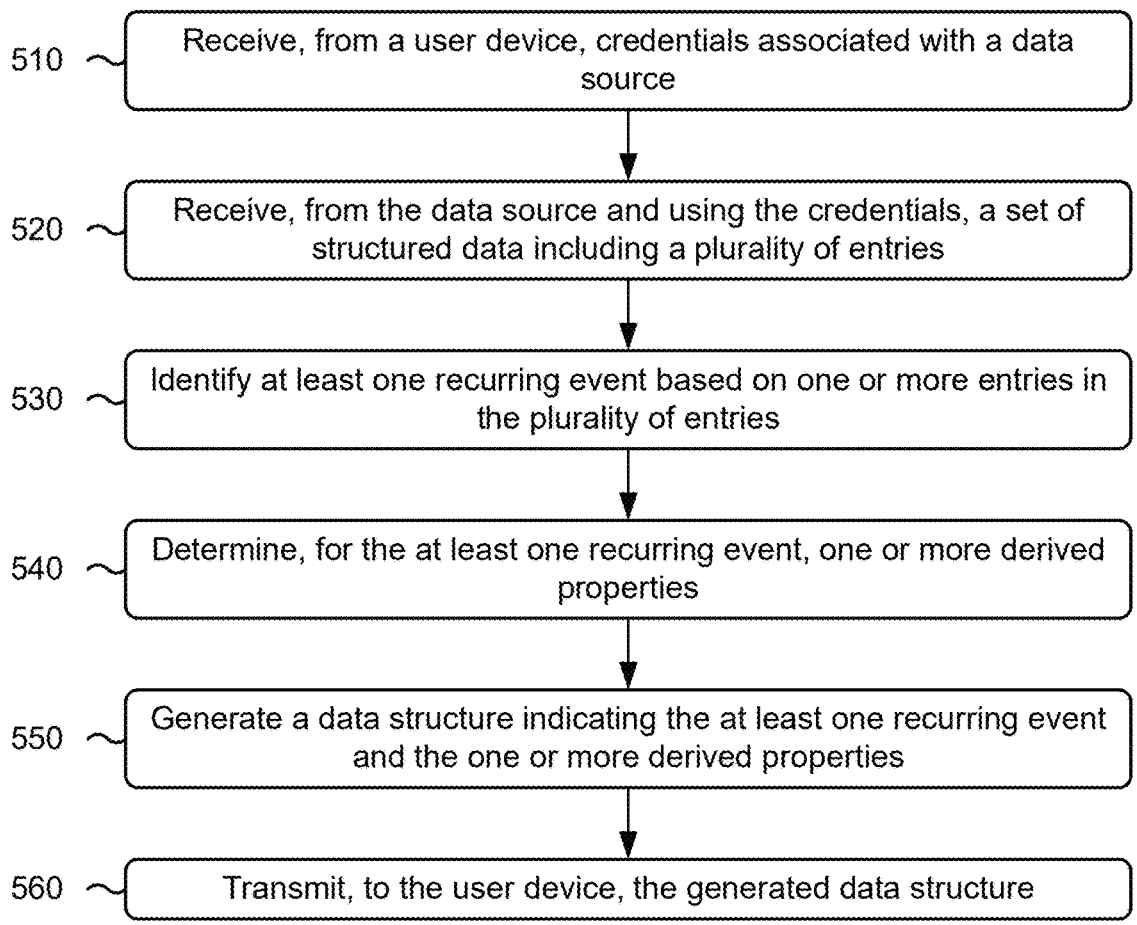
FIG. 5 is a flowchart of an example process relating to pattern identification.

FIG. 5 is a flowchart of an example process 500 associated with pattern identification in structured event data. In some implementations, one or more process blocks of FIG. 5 may be performed by the remote server 301. In some implementations, one or more process blocks of FIG. 5 may be performed by another device or a group of devices separate from or including the remote server 301, such as the user device 330 and/or the data source 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving, from a user device, one or more credentials associated with a data source (block 510). Accordingly, as shown in FIG. 5, process 500 may include receiving, from the data source and using the one or more credentials, a set of structured data including a plurality of entries (block 520).

As further shown in FIG. 5, process 500 may include identifying at least one recurring event based on one or more entries in the plurality of entries (block 530). Additionally, as shown in FIG. 5, process 500 may include determining, for the at least one recurring event, one or more derived properties (block 540).

As shown in FIG. 5, process 500 may include generating a data structure indicating the at least one recurring event and the one or more derived properties (block 550). As further shown in FIG. 5, process 500 may include transmitting, to the user device, the generated data structure (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C and/or FIG. 2.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for pattern identification, the system comprising:
   one or more memories; and
   one or more processors, communicatively coupled to the one or more memories, configured to:
      receive, from a device, by a remote server, and via an application programming interface (API) call associated with the system, a request,
         wherein the request includes a parameter that encapsulates a token associated with the device and authorizes the device to receive structured data;
      receive, from a data source and by the remote server, a set of structured data including a plurality of entries;
      determine, by the remote server and based on a first entry of the plurality of entries being associated with a same event as a first number of other entries of the plurality of entries, that the first number satisfies a threshold number,
         wherein the same event is associated with a first type of a first recurring event;
      determine, by the remote server and based on descriptive data associated with a second entry of the plurality of entries, that the second entry is associated with a second type of a second recurring event,
         wherein an event associated with the second entry is related to a second number of other entries of the plurality of entries,
         wherein the second number does not satisfy the threshold number, and
         wherein the determination of the second entry being associated with the second type of the second recurring event enables distinguishing the first type of the first recurring event from the second type of the second recurring event;
      determine, by the remote server and for the first recurring event, a first derived property;
      determine, by the remote server and for the second recurring event, a second derived property;
      generate, by the remote server, a data structure indicating the first recurring event, the first derived property, the second recurring event, and the second derived property; and
      transmit, by the remote server and to a user device, the generated data structure.

2. The system of claim 1, wherein, to identify the first recurring event, the one or more processors are configured to:
   apply one or more rules to the plurality of entries;
   apply a machine learning model; or
   a combination thereof.

3. The system of claim 1, wherein the descriptive data includes information of a name, and
   wherein the determination that the second entry is associated with a second recurring event is based on determining that the information of the name corresponds to another name previously determined to be associated with the second recurring event.

4. The system of claim 1, wherein the descriptive data includes information of an amount, and
    wherein the determination that the second entry is associated with a second recurring event is based on determining that the information of the amount corresponds to another amount previously determined to be associated with the second recurring event.

5. The system of claim 1, wherein the descriptive data includes information of a name, and
    wherein the determination that the second entry is associated with a second recurring event is based on determining that the information of the name corresponds to another name in a list of names associated with the second recurring event.

6. The system of claim 5, wherein the list of names is determined based on a cluster analysis.

7. The system of claim 5, wherein the list of names is determined based on a filtering analysis.

8. A method of pattern identification, comprising:
    receiving, by a remote server and from a user device and via an application programming interface (API) call, a request that includes one or more credentials associated with a data source,
        wherein the one or more credentials is associated with a parameter that encapsulates a token associated with the user device and authorizes the user device to receive structured data;
    receiving, by the remote server, from the data source and using the one or more credentials, a set of structured data including a plurality of entries;
    determine, by the remote server and based on a first entry of the plurality of entries being associated with a same event as a first number of other entries of the plurality of entries, that the first number satisfies a threshold number,
        wherein the same event is associated with a first type of a first recurring event;
    determine, by the remote server and based on descriptive data associated with a second entry of the plurality of entries, that the second entry is associated with a second type of a second recurring event,
        wherein an event associated with the second entry is related to a second number of other entries of the plurality of entries,
        wherein the second number does not satisfy the threshold number, and
        wherein the determination of the second entry being associated with the second type of the second recurring event enables distinguishing the first type of the first recurring event from the second type of second recurring event;
    determining, by the remote server and for the first recurring event, a first derived property;
    determining, by the remote server and for the second recurring event, a second derived property;
    generating, by the remote server, a data structure indicating the first recurring event, the second recurring event, the first derived property, and the second derived property; and
    transmitting, by the remote server, to the user device, the generated data structure.

9. The method of claim 8, wherein the one or more credentials comprise an access token, a username and password, or a combination thereof.

10. The method of claim 8, further comprising:
    receiving, from the user device, a request to identify recurring events,
        wherein the at least one recurring event is identified in response to the request to identify recurring events.

11. The method of claim 10, wherein the API call is a first API call, and
    wherein the request to identify recurring events is received using a second API call.

12. The method of claim 8, wherein the first number satisfies a threshold value, and
    wherein the second number does not satisfy the threshold value.

13. The method of claim 8, wherein the second recurring event is determined to be an annual recurring event based on applying a plurality of rules based on at least one of a name or an amount.

14. A non-transitory computer-readable medium storing a set of instructions for pattern identification, the set of instructions comprising:
    one or more instructions that, when executed by one or more processors of a device, cause the device to:
        receive, from another device and via an application programming interface (API) call associated with the device, a request,
            wherein the request includes a parameter that encapsulates a token associated with the device and authorizes the device to receive structured data, and
            wherein the device is a remote server device that is remote to the other device;
        receive, from a data source, a set of structured data including a plurality of entries;
        determine, based on a first entry of the plurality of entries being associated with a same event as a first number of other entries of the plurality of entries, that the first number satisfies a threshold number,
            wherein the same event is associated with a first type of a first recurring event;
        determine, based on descriptive data associated with a second entry of the plurality of entries, that the second entry is associated with a second type of a second recurring event,
            wherein an event associated with the second entry is related to a second number of other entries of the plurality of entries,
            wherein the second number does not satisfy the threshold number, and
            wherein the determination of the second entry being associated with the second type of the second recurring event enables distinguishing the first type of the first recurring event from the second type of second recurring event;
        determine, for the first recurring event, a first derived property;
        determine, for the second recurring event, a second derived property;
        generate a data structure indicating the first recurring event, the first derived property, the second derived property, and the second recurring event; and
        transmit, to another device, the generated data structure.

15. The non-transitory computer-readable medium of claim 14, wherein the second recurring event is annual, and wherein identifying the second recurring event comprises:
    applying a plurality of rules based on at least one of a name or an amount to one entry in the plurality of entries.

16. The non-transitory computer-readable medium of claim 15, wherein the one or more instructions, when executed, cause the device to:
perform clustering of a plurality of test transactions into a plurality of groups by name;
perform clustering on a first group, out of the plurality of groups, by amount;
generate one or more first rules, in the plurality of rules, based on clustering the first group;
perform clustering on a second group, out of the plurality of groups, by amount; and
generate one or more second rules, in the plurality of rules, based on clustering the second group.

17. The non-transitory computer-readable medium of claim 14, wherein the one or more instructions, when executed, cause the device to:
determine a category associated with the first recurring event,
wherein the generated data structure indicates the category.

18. The non-transitory computer-readable medium of claim 14, wherein the one or more instructions, when executed, cause the device to:
estimate a frequency associated with the first recurring event,
wherein the generated data structure indicates the frequency.

19. The non-transitory computer-readable medium of claim 14, wherein the generated data structure indicates a first date and a last date associated with first recurring event.

20. The non-transitory computer-readable medium of claim 14, wherein the first number satisfies a threshold value, and
wherein the second number does not satisfy the threshold value.

* * * * *